（12）United States Patent
Sekiguchi et al.

(10) Patent No.: US 11,555,130 B2
(45) Date of Patent: Jan. 17, 2023

(54) INK, PRE-PROCESSING FLUID-INK SET, INKJET PRINTING DEVICE, AND INKJET PRINTING METHOD

(71) Applicants: Satoyuki Sekiguchi, Kanagawa (JP); Toshiyuki Kobashi, Kanagawa (JP)

(72) Inventors: Satoyuki Sekiguchi, Kanagawa (JP); Toshiyuki Kobashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 53 days.

(21) Appl. No.: 17/304,144

(22) Filed: Jun. 15, 2021

(65) Prior Publication Data

US 2022/0010158 A1 Jan. 13, 2022

(30) Foreign Application Priority Data

Jul. 3, 2020 (JP) .............................. JP2020-115827

(51) Int. Cl.
*C09D 11/40* (2014.01)
*B41J 11/00* (2006.01)
*B41J 2/17* (2006.01)

(52) U.S. Cl.
CPC ............. *C09D 11/40* (2013.01); *B41J 2/1714* (2013.01); *B41J 11/002* (2013.01)

(58) Field of Classification Search
CPC ....... C09D 11/322; C09D 11/38; C09D 11/54; C09D 11/00; B41J 11/002; B41M 5/0017; B41M 5/0011
See application file for complete search history.

(56) References Cited

U.S. PATENT DOCUMENTS 4,096,294 A * 6/1978 Pacansky .............. G03G 13/286
427/388.1
2002/0168164 A1* 11/2002 Bishop ...................... C08L 67/07
385/128

(Continued)

FOREIGN PATENT DOCUMENTS

JP H07-082456 3/1995
JP 2006-205465 8/2006

(Continued)

OTHER PUBLICATIONS

Brazilian Archives of Biology and Technology, May-Jun. 2009 "Thermal and Spectroscopic Analyses on the Molecular Interaction Between Euclyptus Kraft Pulp Components and Offset Printing Inks" vol. 52, n.3: pp. 689-699; Retrieved Sep. 29, 2022. (Year: 2009).*

(Continued)

*Primary Examiner* — John Zimmermann
(74) *Attorney, Agent, or Firm* — Grüneberg and Myers PLLC

(57) ABSTRACT

Provided is an ink including water, and an organic solvent, wherein a dried product of the ink has an endothermic peak temperature Tm of 22° C. or higher but 74° C. or lower as measured by differential scanning calorimetry, the differential scanning calorimetry includes first heating, cooling, and second heating, where the first heating is heating the dried product of the ink from −60° C. to 140° C. at a heating rate of 10° C./min, the cooling, which is performed after the first heating, is cooling a heated product obtained in the first heating from 140° C. to −60° C. at a cooling rate of −10° C./min, and the second heating, which is performed after the cooling, is heating a cooled product obtained in the cooling from −60° C. to 140° C. at a heating rate of 10° C./min, and (Continued)

the endothermic peak temperature Tm is an endothermic peak temperature in the second heating.

13 Claims, 2 Drawing Sheets

(56) References Cited

U.S. PATENT DOCUMENTS

| | | | |
|---|---|---|---|
| 2011/0200751 A1* | 8/2011 | Yatake | C09D 11/54 |
| | | | 977/773 |
| 2012/0232203 A1* | 9/2012 | Tomura | C09D 11/40 |
| | | | 524/386 |
| 2012/0295042 A1* | 11/2012 | Nito | B41M 5/5227 |
| | | | 428/32.23 |
| 2016/0319186 A1* | 11/2016 | Chopade | C09K 8/685 |
| 2017/0130082 A1 | 5/2017 | Sekiguchi et al. | |
| 2017/0247561 A1 | 8/2017 | Nakagawa et al. | |
| 2017/0355868 A1 | 12/2017 | Saiga et al. | |
| 2018/0244935 A1* | 8/2018 | Sakaguchi | C09D 11/12 |
| 2019/0016911 A1* | 1/2019 | Okamoto | C09D 11/40 |
| 2019/0092956 A1 | 3/2019 | Imanaga et al. | |
| 2019/0284419 A1 | 9/2019 | Kobashi et al. | |
| 2019/0284421 A1 | 9/2019 | Sekiguchi et al. | |
| 2020/0048482 A1 | 2/2020 | Sekiguchi et al. | |
| 2020/0101767 A1* | 4/2020 | Kobashi | B41J 3/4078 |
| 2020/0101782 A1* | 4/2020 | Sekiguchi | B41J 11/0024 |
| 2021/0094294 A1 | 4/2021 | Kobashi et al. | |
| 2021/0094319 A1 | 4/2021 | Kobashi et al. | |
| 2021/0115285 A1 | 4/2021 | Kobashi et al. | |

FOREIGN PATENT DOCUMENTS

| | | |
|---|---|---|
| JP | 2014-125555 | 7/2014 |
| JP | 2014-233957 | 12/2014 |
| JP | 2016-145312 | 8/2016 |
| JP | 2017-186702 | 10/2017 |
| JP | 2017-206021 | 11/2017 |
| JP | 2018-123235 | 8/2018 |
| JP | 2019-059187 | 4/2019 |
| JP | 2019-163380 | 9/2019 |
| JP | 2019-163383 | 9/2019 |

OTHER PUBLICATIONS

U.S. Appl. No. 17/130,725, filed Dec. 22, 2020.

* cited by examiner

INK, PRE-PROCESSING FLUID-INK SET, INKJET PRINTING DEVICE, AND INKJET PRINTING METHOD

CROSS-REFERENCE TO RELATED APPLICATIONS

The present application claims priority under 35 U.S.C. § 119 to Japanese Patent Application No. 2020-115827, filed Jul. 3, 2020. The contents of which are incorporated herein by reference in their entirety.

BACKGROUND OF THE INVENTION

Field of the Invention

The present disclosure relates to an ink, a pre-processing fluid-ink set, an inkjet printing device, and an inkjet printing method.

Description of the Related Art

Inkjet printers have been widely used as digital signal output devices for home use, because the inkjet printers have advantageous, such as low noise, low running cost, and easiness of color printing.

In recent years, as well as home use, there has been a demand in the inkjet printers for achieving image quality equivalent to image quality of conventional analog printing with mild-permeation media, such as coat paper, non-absorption media, such as plastic films, and fabrics, such as cloth and knitting, according to an inkjet printing method.

In the field of food packaging, so-called soft packaging, for example, rapid developments have been seen in reduction in lot numbers of a printing job and increase in varieties of a printing job. In addition, a demand for variable printing has been increased. Therefore, a development of an inkjet printing system applicable on films for soft packaging, such as polyolefin-based films, polyester-based films, and polyamide-based films, has been desired.

In the printing field, as well as the soft packaging field, a demand for an inkjet printing system capable of forming images on fabrics with excellent coloring and fastness against various factors has been increased along with the trends for prosperity of the personal recommendation business in the apparel industry, or popularity of corroboration with fine art in the interior textile industry.

As such an ink for fabrics, aqueous inks have been actively developed in view of a low volatile organic compound (VOC) content and safety.

In the printing field, technologies for conventional cottons have been developed. However, a demand for printing on polyester, which has excellent strength, morphological stability, breathability, and quick drying properties, and is relatively inexpensive, has been currently rapidly increased.

For example, Japanese Unexamined Patent Application Publication No. 2017-186702 discloses a printing method including depositing an ink composition including a pigment on a fabric by an inkjet method, and a depositing a processing fluid including a first resin on the fabric in the state where a drying rate of the ink composition is less than 90%.

SUMMARY OF THE INVENTION

According to an aspect (1) of the present disclosure, an ink includes water and an organic solvent. A dried product of the ink has an endothermic peak temperature Tm of 22° C. or higher but 74° C. or lower as measured by differential scanning calorimetry. The differential scanning calorimetry includes first heating, cooling, and second heating. The first heating is heating the dried product of the ink from −60° C. to 140° C. at a heating rate of 10° C./min, the cooling, which is performed after the first heating, is cooling a heated product obtained in the first heating from 140° C. to −60° C. at a cooling rate of −10° C./min, and the second heating, which is performed after the cooling, is heating a cooled product obtained in the cooling from −60° C. to 140° C. at a heating rate of 10° C./min. The endothermic peak temperature Tm is an endothermic peak temperature in the second heating.

DESCRIPTION OF THE EMBODIMENTS

Figure 1:
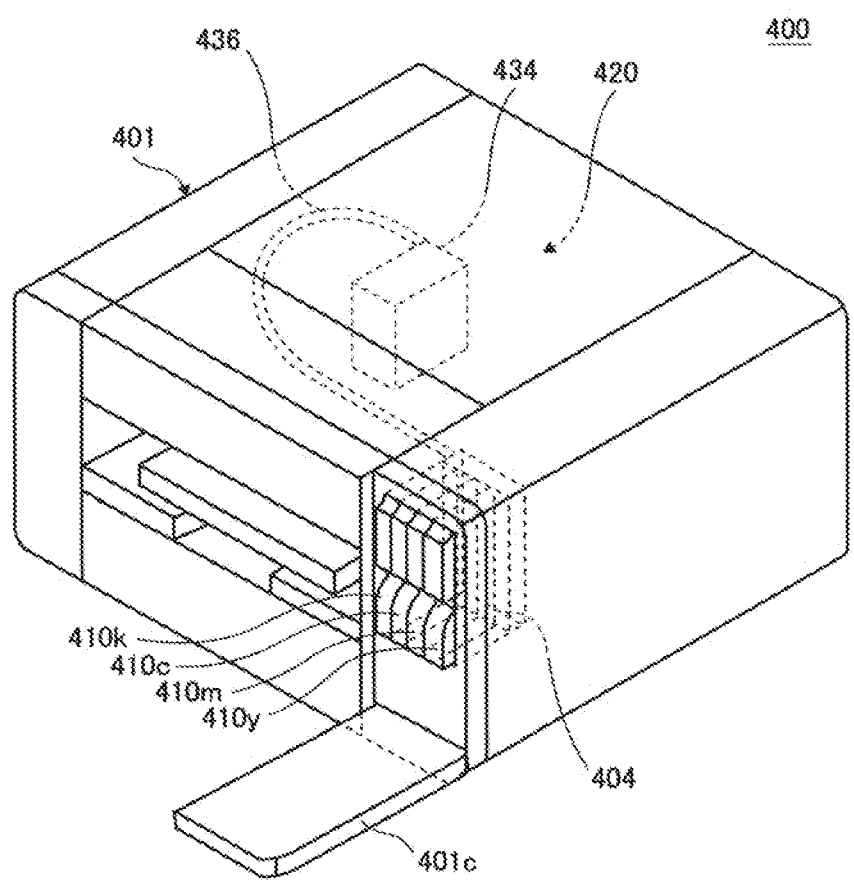
FIG. 1 is a perspective explanatory view illustrating an example of an inkjet printing device.

The present disclosure is directed to the aspect (1), but also include the following aspects (2) to (13) as embodiments.

(2) The ink according to (1),
wherein an exothermic peak temperature Tc in the cooling and the endothermic peak temperature in the second heating satisfy a relationship represented by:

$$20 \le (Tm-Tc) \le 70.$$

(3) The ink according to (2),
wherein a quantity of heat absorbed Q1 at the endothermic peak in the second heating is from 2 J/g through 30 J/g.
(4) The ink according to any one of (1) to (3), further including a polyurethane resin including a polyester segment.
(5) The ink according to any one of (1) to (4), further including a silicone-based surfactant.
(6) The ink according to any one of (1) to (5),
wherein the ink has a dynamic surface tension of 40 mN/m or greater but 50 mN/m or less at 25° C. with lifetime of 150 ms.
(7) A pre-processing fluid-ink set including:
a pre-processing fluid; and
the ink according to any one of (1) to (5).
(8) The pre-processing fluid-ink set according to (7),
wherein the pre-processing fluid includes organo polysiloxane having a weight average molecular weight of 5,000 or greater but 500,000 or less.
(9) The pre-processing fluid-ink set according to (7) or (8),
wherein the pre-processing fluid includes a metal ion, and an amount of the metal ion is 0.8 g/L or greater but 20 g/L or less.
(10) An inkjet printing device including
a discharging unit configured to discharge the ink according any one of (1) to (5).
(11) The inkjet printing device according to (10), further including a unit configured to apply a pre-processing fluid.
(12) An inkjet printing method, including
discharging the ink according to any one of (1) to (5).
(13) The inkjet printing method according to (12), further including applying a pre-processing fluid.

The method disclosed in the patent literature of the related art cannot impart fastness and texture to an image formed on a medium formed of synthetic fibers, such as polyester, to the level of the market demands.

Accordingly, the present disclosure has an object to provide an ink, which can improve fastness of an image, and can impart flexible texture when the ink is used on print media formed of synthetic fibers, such as polyester.

The present disclosure can provide an ink, which can improve fastness of an image, and can impart flexible texture when the ink is used on print media formed of synthetic fibers, such as polyester.

The ink of the present disclosure include water and an organic solvent. A dried product of the ink has an endothermic peak temperature Tm of 22° C. or higher but 74° C. or lower as measured by differential scanning calorimetry. The differential scanning calorimetry includes first heating, cooling, and second heating. The first heating is heating the dried product of the ink from −60° C. to 140° C. at a heating rate of 10° C./min, the cooling, which is performed after the first heating, is cooling a heated product obtained in the first heating from 140° C. to −60° C. at a cooling rate of −10° C./min, and the second heating, which is performed after the cooling, is heating a cooled product obtained in the cooling from −60° C. to 140° C. at a heating rate of 10° C./min. The endothermic peak temperature Tm is an endothermic peak temperature in the second heating.

When Tm is outside the above-mentioned range, fastness and texture are not impaired. The reason thereof may be because an ink layer becomes rigid and adhesion of the ink layer decreases when Tm is too high, and the strength of the ink layer decreases, and friction resistance between fibers increases when Tm is too low.

Tm is more preferably 30° C. or higher but 70° C. or lower, and particularly preferably 40° C. or higher but 60° C. or lower.

The dried product of the ink is obtained by the following method.

First, 3 g of the ink is collected in a PFA Petri dish having an inner diameter of 50 mm, and the collected ink is dried at 50° C. for 5 hours, followed by drying at 100° C. for 15 hours by means of a hot air circulation drier. Subsequently, the toner is vacuum dried for 6 hours by a vacuum drier which is set to 100° C., with degassing by a vacuum pump to achieve the internal vacuum degree of 1 Torr or lower, to thereby obtain a dried product of the ink.

For example, the differential scanning calorimetry of the dried product of the ink can be performed in the following manner. First, about 5.0 mg of the dried product of the ink is collected in a sample container formed of aluminium, and the dried product is subjected to a measurement by means of DSC System Q-2000 (available from TA Instruments Japan, Inc.). Specifically, the aluminium sample container, in which about 5.0 mg of the dried product of the ink is placed, is set in the device, and the measurement is performed under a nitrogen flow under the following measuring conditions.

[Measuring Conditions]
Heating from −60° C. to 140° C. at a heating rate of 10° C./min (first heating) Holding the temperature at 140° C. for 5 minutes
Cooling from 140° C. to −60° C. at a cooling rate of 10° C./min (cooling) Holding the temperature at −60° C. for 5 minutes
Heating from −60° C. to 140° C. at a heating rate of 10° C./min (second heating)

An apex of the maximum endothermic peak and an apex of the maximum exothermic peak on the thermogram obtained under the above-described measuring conditions are determined as Tm and Tc, respectively.

The exothermic peak temperature Tc in the cooling as obtained by the differential scanning calorimetry on the dried product of the ink and Tm preferably satisfy the relationship represented by $20 \leq (Tm-Tc) \leq 70$, more preferably $25 \leq (Tm-Tc) \leq 60$, and particularly preferably $30 \leq (Tm-Tc) \leq 50$ in view of fastness.

Moreover, the quantity of heat absorbed Q1 at the endothermic peak in the second heating is preferably from 2 J/g through 30 J/g, more preferably from 4 J/g through 20 J/g, and particularly preferably from 6 J/g through 15 J/g, in order to achieve both fastness and texture. Q1 can be calculated from the area of the endothermic peak, and the weight of the dried product of the ink subjected to the measurement.

A method for adjusting Tm, Tc, and Q1 is not particularly limited and any of the methods known in the art can be used. Examples thereof include a method where an amount of the resin in the ink or the resin composition is adjusted to adjust Tm, Tc, and Q1.

A resin for use in the ink of the present disclosure is not particularly limited and may be appropriately selected depending on the intended purpose. Examples thereof include a polyurethane resin, a polyester resin, an acryl-based resin, a vinyl acetate-based resin, a styrene-based resin, a butadiene-based resin, a styrene-butadiene-based resin, a vinyl chloride-based resin, an acryl styrene-based resin, an acryl silicone-based resin, and a polyolefin resin.

Resin particles formed of any of the above-listed resins may be used. The resin particles in the form of a resin emulsion where the resin particles are dispersed in water serving as a dispersing medium may be mixed with materials, such as a coloring material and an organic solvent, to form the ink. Moreover, the resin particles may be used as composite resin particles where the resin particles are adsorbed on a pigment to cover a part of or the entire area of the pigment with the resin. The resin particles may be appropriately synthesized for use, or selected from commercial products. The above-mentioned resin particles may be used alone or in combination of two or more groups of the resin particles.

Among the above-listed examples, the resin is preferably a polyurethane resin, and more preferably a polyurethane resin including a polyester segment in view of an improvement of the effect obtainable by the present disclosure. Note that, Tm, Tc, and Q1 can be adjusted, for example, by varying a structure of the resin, such as polyester, polycarbonate, polyether, and polyolefin.

The ink of the present disclosure preferably includes a silicone-based surfactant in view of fastness, image density, and image uniformity.

The silicone-based surfactant is not particularly limited and may be appropriately selected depending on the intended purpose. The silicone-based surfactant is preferably a compound represented by General Formula (2) below in view of image density, and inhibition of bleeding and density unevenness.

General Formula (2)

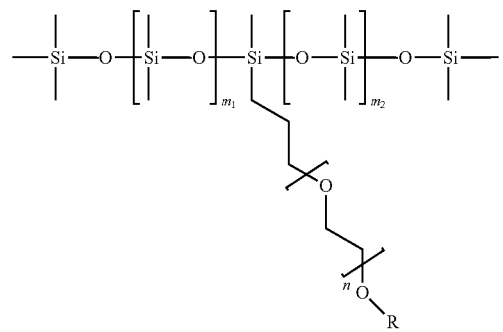

In General Formula (2). R is a hydrogen atom or a methyl group, m1 and m2 are each an integer of from 0 through 6, and n is an integer of from 2 through 20.

In General Formula (2), R is preferably a hydrogen atom in view of storage stability of the ink and uniformity, and is preferably a methyl group in view of image density, and R is more preferably a combination of a hydrogen atom and a methyl group.

Examples of the silicone-based surfactant include: BYK-345, BYK-347, BYK-348, and BYK-349 (all available from BYK); WET240, 270, and 280 (all available from Evonik); and SAG002, 013, and 503A (all available from Nissin Chemical Co., Ltd.).

An amount of the silicone-based surfactant in the ink is not particularly limited and may be appropriately selected depending on the intended purpose. The amount thereof is preferably 0.001% by mass or greater but 5% by mass or less, and more preferably 0.05% by mass or greater but 5% by mass or less, in view of excellent wettability and discharging stability, and improvements in image quality and fastness.

The surface tension (dynamic surface tension) of the ink of the present disclosure at 25° C. with lifetime of 150 ms is, for example, 30 mN/m or greater but 60 mN/m or less, preferably 35 mN/m or greater but 55 mN/m or less, and more preferably 40 mN/m or greater but 50 mN/m or less in view of image coloring and discharging stability.

The dynamic surface tension can be controlling by adjusting selection of a surfactant for use and an amount of the surfactant to be added.

The dynamic surface tension can be measured by any of the methods known in the art. In the present disclosure, the dynamic surface tension is preferably measured by the maximum bubble pressure method. A measuring device of the dynamic surface tension according to the maximum bubble pressure method is commercially available. Examples thereof include Dyno Tester (available from SITA).

The maximum bubble pressure method is a method where bubbles are released from a tip of a probe immersed in a sample liquid, and surface tension is determined from the maximum pressure required to release the bubbles.

The bubble pressure reaches the maximum pressure when a radius of a bubble is equal to a radius of the tip of the probe, and the dynamic surface tension a of the ink is represented by the following equation.

$$o=(\Delta P \cdot r)/2$$

In the equation above, r is the radius of the tip of the probe, and $\Delta P$ is a difference between the maximum bubble pressure and the minimum bubble pressure.

Moreover, the term "lifetime" in the present disclosure means a time period from the time when a bubble is released from the probe to form a new interface to the time when the bubble pressure of the following bubble reaches the maximum pressure according to the maximum bubble pressure method.

<Ink>

The organic solvent, water, coloring material, resin, additives, etc., used for the ink will be described hereinafter.

<Organic Solvent>

There is no specific limitation on the type of the organic solvent used in the present disclosure. For example, water-soluble organic solvents are suitable. Specific examples thereof include, but are not limited to, polyvalent alcohols, ethers such as polyvalent alcohol alkyl ethers and polyvalent alcohol aryl ethers, nitrogen-containing heterocyclic compounds, amides, amines, and sulfur-containing compounds.

Specific examples of the water-soluble organic solvents include, but are not limited to, polyvalent alcohols, such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol; polyvalent alcohol alkyl ethers, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyvalent alcohol aryl ethers, such as ethylene glycol monophenyl ether, and ethylene glycol monobenzyl ether; nitrogen-containing heterocyclic compounds, such as 2-pyrolidone, N-methyl-2-pyrolidone, N-hydroxyethyl-2-pyrolidone, 1,3-dimethyl-2-imidazolidinone, ε-caprolactam, γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate; and ethylene carbonate.

Since the water-soluble organic solvent serves as a humectant and also imparts a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyvalent alcohol alkyl ethers, such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyvalent alcohol aryl ethers, such as ethylene glycol monophenyl ether, and ethylene glycol monobenzyl ether.

The proportion of the organic solvent in ink has no particular limit and can be suitably selected to suit a particular application. In terms of the drying property and discharging reliability of the ink, the proportion is preferably from 10 to 60 percent by mass and more preferably from 20 to 60 percent by mass.

<Water>

The proportion of water in the ink has no particular limit. In terms of the drying property and discharging reliability of the ink, the proportion is preferably from 10 to 90 percent by mass and more preferably from 20 to 60 percent by mass.

<Coloring Material>

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The type of dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in ink is preferably from 0.1 to 15 percent by mass and more preferably from 1 to 10 percent by mass in terms of enhancement of image density, fixability, and discharging stability.

To obtain the ink, the pigment is dispersed by, for example, preparing a self-dispersible pigment by introducing a hydrophilic functional group into the pigment, coating the surface of the pigment with a resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to ink is not necessarily coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, nonionic surfactants, amphoteric surfactants, etc. depending on the pigments.

Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

<Pigment Dispersion>

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably from 20 to 500 nm and more preferably from 20 to 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the content is preferably from 0.1 to 50 percent by mass and more preferably from 0.1 to 30 percent by mass.

During the production, coarse particles are optionally filtered off with a filter, a centrifuge, etc. preferably followed by degassing.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 to 30 percent by mass and more preferably from 5 to 20 percent by mass to the total content of the ink.

The particle diameter of the solid portion in ink has no particular limit. For example, the maximum frequency in the maximum number conversion is preferably from 20 to 1,000 and more preferably from 20 to 150 nm to ameliorate the discharging stability and image quality such as image density. The solid portion includes resin particles, particles of pigments, etc. The particle diameter of the solid portion can be measured by using a particle size analyzer (Nanotrac Wave-UT151, manufactured by MicrotracBEL Corp).

<Additive>

The ink may further optionally contain a surfactant, a defoaming agent, a preservative and fungicide, a corrosion inhibitor, a pH regulator, etc.

<Surfactant>

As the surfactant, any of silicone-based surfactants, fluorosurfactants, amphoteric surfactants, nonionic surfactants, and anionic surfactants can be used.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The fluorosurfactant is preferably a fluorosurfactant in which the number of carbon atoms replaced with fluorine atoms is from 2 to 16, more preferably 4 to 16.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following General Formula F-1 or General Formula F-2 is more preferable.

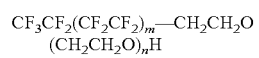

General Formula F-1

In General Formula F-1, "m" is preferably 0 or an integer of from 1 to 10 and "n" is preferably 0 or an integer of from 1 to 40 in order to impart water solubility to the compound represented by General Formula F-1.

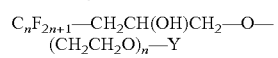

General Formula F-2

In General Formula F-2, Y represents H, $C_mF_{2m+1}$, where "m" is an integer of from 1 to 6, $H_2CH(OH)CH_2$—$C_mF_{2m+1}$, where m represents an integer of from 4 to 6, or $C_pH_{2p+1}$, where p represents an integer of from 1 to 19. "n" represents an integer of from 1 to 6. "a" represents an integer of from 4 to 14.

Products available on the market may be used as the fluorosurfactant. Specific examples of the products available on the market include, but are not limited to, SURFLON S-111, S-112, S-113, S-121, S-131, S-132, S-141, and S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL™ TBS, FSP, FSA, FSN-100, FSN, FSO-100, FSO, FS-300, UR, CAPSTONE® FS-30, FS-31, FS-3100, FS-34, FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, PF-159 (manufactured by OMNOVA SOLUTIONS INC.), and UNIDYNE DSN-403N (manufactured by DAIKIN INDUSTRIES). Of these, FS-3100. FS-34, and FS-300 (all manufactured by The Chemours Company), FT-110, FT-250, FT-251, FT-400S, FT-150, and FT-400SW (all manufactured by NEOS COMPANY LIMITED), PolyFox PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation, wettability, and uniform dying property to paper.

The proportion of the surfactant in ink is not particularly limited. It is preferably from 0.001 to 5 percent by mass and more preferably from 0.05 to 5 percent by mass ink in terms of excellent wettability and discharging stability and improvement on image quality.

<Defoaming Agent>

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable to easily break foams.

<Preservatives and Fungicides>

The preservatives and fungicides are not particularly limited. A specific example is 1,2-benzisothiazolin-3-on.

<Corrosion Inhibitor>

The corrosion inhibitor has not particular limit. Examples thereof are acid sulfite and sodium thiosulfate.

<pH Regulator>

The pH regulator has no particular limit. It is preferable to adjust the pH to 7 or higher. Specific examples thereof include, but are not limited to, amines such as diethanol amine and triethanol amine.

The property of the ink is not particularly limited. For example, viscosity, surface tension, pH, etc., are preferably in the following ranges.

The viscosity of the ink at 25 degrees C. is preferably from 5 to 30 mPa·s and more preferably from 5 to 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably levelized on a print medium and the drying time of the ink is shortened.

The pH of the ink is preferably from 7 to 12 and more preferably from 8 to 11 in terms of prevention of corrosion of metal materials contacting the ink.

<Pre-Processing Fluid>

The pre-processing fluid contains a metal ion, organo polysiloxane, a flocculant, an organic solvent, water, and optional materials such as a surfactant, a defoaming agent, a pH regulator, a preservatives and fungicides and a corrosion inhibitor.

The organic solvent, the surfactant, the defoaming agent, the pH regulator, the preservatives and fungicides, and the corrosion inhibitor can be the same material as those for use in the ink. Also, other materials for use in known processing fluid can be used.

The type of the flocculant is not particularly limited. For example, water-soluble cationic polymers, acids, and multivalent metal salts are suitable.

<Metal Ion>

The metal ion included in the pre-processing fluid of the present disclosure is appropriately selected from those known in the art. Examples thereof include a sodium ion, a potassium ion, a calcium ion, a magnesium ion, and an aluminium ion. The above-listed examples may be used alone or in combination.

The metal ion can be added to the pre-processing fluid by dissolving a water-soluble metal salt.

The metal salt may be appropriately selected from metal salts known in the art. For example, the metal salt is preferably a carboxylic acid salt (e.g. acetic acid salt, and lactic acid salt), sulfuric acid salt, nitric acid salt, chloride, and thiocyanic acid salt. The above-listed metal salts may be used alone or in combination. Among the above-listed examples, carboxylic acid salt, sulfuric acid salt, nitric acid salt, and chloride, which have excellent solubility to water and a water-soluble organic solvent, are preferable.

The metal salt for use in the present disclosure is preferably calcium nitrate, calcium chloride, calcium acetate, magnesium nitrate, and sodium chloride in view of excellent solubility, and excellent permeation to fabrics.

An amount of the metal ion in the pre-processing fluid is preferably 0.8 g/L or greater but 20 g/L or less, and more preferably 4.0 g/L or greater but 18 g/L or less in view of texture owing to controlled permeation of the ink to fabrics, and improvement of fastness.

The presence and amount of the metal ion in the pre-processing fluid can be analyzed by inductively coupled plasma atomic emission spectroscopy (ICP-AES), ion chromatography, etc.

<Organo Polysiloxane>

The pre-processing fluid of the present disclosure may include organo polysiloxane. Since the pre-processing fluid including the organo polysiloxane is applied, friction resistance between fibers is reduced to impart flexibility to fabrics. Moreover, the pre-processing fluid including the organo polysiloxane imparts lubricity to an ink layer to improve fastness.

The organo polysiloxane included in the pre-processing fluid of the present disclosure is not particularly limited. Examples thereof include: organo polysiloxane, such as dimethyl polysiloxane; and modified organo polysiloxane, such as polyether-modified organo polysiloxane, amino-modified organo polysiloxane, hydroxyl-modified organo polysiloxane, epoxy-modified organo polysiloxane, and phenyl-modified organo polysiloxane. The above-listed examples may be used alone or in combination. Among the above-listed examples, dimethyl polysiloxane and/or amino-modified organo polysiloxane are preferable in view of texture of a print on fabrics, and improvement in fastness.

The organo polysiloxane can be synthesized by synthesis methods known in the art, such as a hydrolysis condensation polymerization method of chlorosilane or alkoxy silane, and a ring-opening polymerization method of cyclic siloxane.

In accordance with the ring-opening polymerization method of cyclic siloxane, a cyclic siloxane oligomer is reacted in the presence of an acid catalyst or a base catalyst under appropriate conditions to perform ring-opening polymerization to thereby obtain a high molecular weight polymer.

Examples of the cyclic siloxane oligomer include: cyclic dimethyl siloxane, such as hexamethyl cyclotrisiloxane, and octamethyl cyclotetrasiloxane; cyclic methyl vinyl siloxane, such as tetramethyl tetravinyl cyclotetrasiloxane; cyclic diphenyl siloxane, such as octaphenyl cyclotetrasiloxane; and cyclic methyl trifluoropropyl siloxane, such as trimethyl trifluoropropyl cyclotrisiloxane. The above-listed cyclic siloxane oligomers may be used alone or in combination as a mixture.

Moreover, the polymerization reaction is terminated by using low-molecular weight linear organo polysiloxane as a terminal-blocking agent to control the weight average molecular weight of the organo polysiloxane. As the terminal-blocking agent, known chain terminators, such as a trialkyl siloxy chain terminator (e.g., a vinyl chain terminator, and a methyl chain terminator) may be used. The above-listed terminal-blocking agents may be used alone or in combination, and the terminal-blocking agent may be appropriately selected depending on use of the final product. An amount of the terminal-blocking agent is preferably from 0.0001 parts by mass through 10 parts by mass, and particularly preferably from 0.0001 parts by mass through 5 parts by mass, relative to 100 parts by mass of the cyclic siloxane oligomer.

Examples of the base catalyst used for the ring-opening polymerization method of the cyclic siloxane oligomer include potassium hydroxide, tetramethylammonium hydroxide, and tetrabutylphosphonium hydroxide. Examples of the acid catalyst include sulfuric acid, trifluoromethanesulfonic acid, activated clay, and phosphonitrilic chloride.

The weight average molecular weight of the synthesized organo polysiloxane can be measured by gel permeation chromatography (GPC).

The weight average molecular weight of the organo polysiloxane is preferably 5,000 or greater but 500,000 or less, and more preferably 19,000 or greater but 210,000 or less in view of texture and improvement in fastness.

The weight average molecular weight can be measured by gel permeation chromatography (GPC) under the following conditions.
Device: GPC-8020 (available from TOSOH CORPORATION)
Columns: TSK G2000HXL and G4000HXL (both available from TOSOH CORPORATION)
Temperature: 40° C.
Solvent: tetrahydrofuran (THF)
Flow rate: 1.0 mL/min An embodiment of the organo polysiloxane included in the pre-processing fluid is preferably an embodiment where the organo polysiloxane is dispersed in the pre-processing fluid. Among such an embodiment, an embodiment where the organo polysiloxane is dispersed as particles using a surfactant in the pre-processing fluid is more preferable in view of stability. For example, the particle diameters of the organo polysiloxane are in the range of from 50 nm through 10,000 nm.

The organo polysiloxane can be dispersed by an emulsion polymerization method or phase-transfer emulsification known in the art. An emulsifier for use is not particularly limited. For example, a homomixer, a homogenizer, a colloid mill, a multi-purpose mixer/stirrer, COMBI MIX, a line mixer, etc. may be used as the emulsifier. The solid content of the organo polysiloxane is preferably from 10% by mass through 70% by mass, and more preferably from 20% by mass through 60% by mass.

The surfactant used for dispersing the organo polysiloxane is not particularly limited, and may be appropriately selected from a nonionic surfactant, an anionic surfactant, a cationic surfactant, and an amphoteric surfactant. Examples of the nonionic surfactant include: polyoxyalkylene alkyl ethers, such as polyoxyethylene alkyl ether, and polyoxyethylene propylene alkyl ether; and polyoxyethylene fatty acid esters. Examples of the cationic surfactant include quaternary ammonium salts, and alkyl amine acetic acid salts. Examples of the anionic surfactant include alkyl sulfuric acid salts, alkyl benzene sulfonic acid salt, alkyl sulfosuccinic acid salt, polyoxyethylene alkyl ether sulfuric acid salt, and polyoxyethylene alkyl phenyl ether sulfuric acid salt. The above-listed examples may be used alone or in combination.

An amount of the organo polysiloxane in the pre-processing fluid is preferably 0.1% by mass or greater but 20.0% by mass or less, and more preferably 0.5% by mass or greater but 10% by mass or less in view of texture and improvement in fastness.

<Post-Processing Fluid>

The post-processing fluid is not particularly limited as long as the post-processing fluid can form a transparent layer. Materials such as organic solvents, water, resins, surfactants, defoaming agents, pH regulators, preservatives and fungicides, corrosion inhibitors, etc. are suitably selected based on a necessity basis and mixed to obtain the post-processing fluid. The post-processing fluid can be applied to the entire printing area on a print medium or only the printed area.

The print medium is not limited to articles used as typical print media. It is suitable to use building materials such as wall paper, floor materials, and tiles, cloth for apparel such as T-shirts, textile, and leather as the print medium. In addition, the configuration of the paths through which the print medium is transferred can be adjusted to accommodate ceramics, glass, metal, etc.

<Printed Matter>

The printed matter of the present disclosure includes a print medium and an image formed on the print medium with the ink of the present disclosure.

An inkjet printing device and an inkjet printing method are used to print the image on the print medium to obtain printed matter.

<Printing Device and Printing Method>

The ink of the present disclosure can be suitably applied to various printing devices employing an inkjet printing method such as printers, facsimile machines, photocopiers, multifunction peripherals (serving as a printer, a facsimile machine, and a photocopier), and 3D model manufacturing devices.

In the present disclosure, the printing device and the printing method represent a device capable of discharging ink, various processing fluids, etc. to a print medium and a method printing an image on the print medium using the device. The print medium means an article to which the ink or the various processing fluids can be attached at least temporarily.

The printing device may further optionally include a device relating to feeding, transferring, and ejecting the print medium and other devices referred to as a pre-processing device, a post-processing device, etc. in addition to the head portion to discharge the ink.

The printing device and the printing method may further optionally include a heater for use in the heating process and a drier for use in the drying process. For example, the heating device and the drying device heat and dry the top surface and the bottom surface of a print medium having an image. The heating device and the drying device are not particularly limited. For example, a fan heater and an infra-red heater can be used. The print medium can be heated and dried before, during, and after printing.

In addition, the printing device and the printing method are not limited to those producing merely meaningful visible images such as texts and figures with the ink. For example, the printing device and the printing method can produce patterns like geometric design and 3D images.

In addition, the printing device includes both a serial type device in which the liquid discharging head is caused to move and a line type device in which the liquid discharging head is not moved, unless otherwise specified.

Furthermore, in addition to the desktop type, this printing device includes a wide type capable of printing images on a large print medium such as A0, a continuous printer capable of using continuous paper wound up in a roll form as print media.

Figure 2:
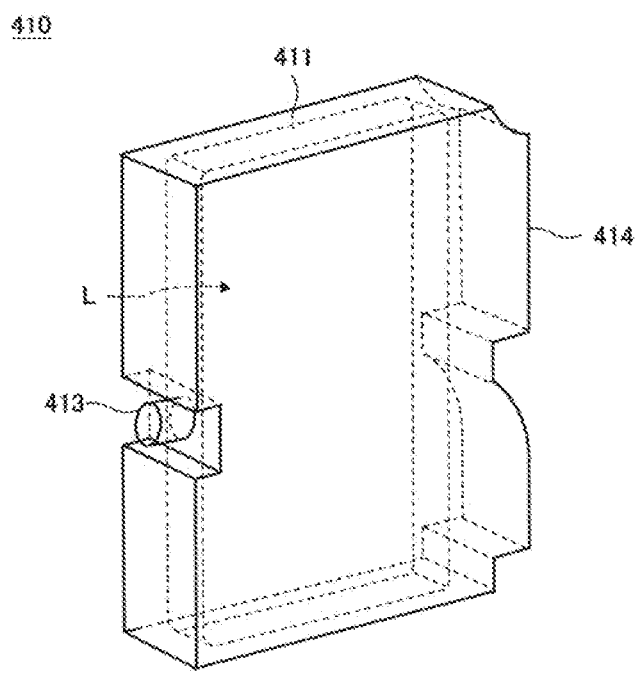
FIG. 2 is a perspective explanatory view illustrating an example of a main tank of the inkjet printing device.

The printing device of the present disclosure is described using an example with reference to FIG. 1 and FIG. 2. FIG. 1 is a perspective view illustrating the image printing device. FIG. 2 is a perspective view illustrating the main tank. An image forming apparatus 400 as an example of the printing device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packing member such as aluminum laminate film. The ink container 411 is accommodated in a plastic housing unit 414. As a result, the main tank 410 is used as an ink cartridge of each color.

A cartridge holder 404 is disposed on the rear side of the opening when a cover 401c is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

This printing device includes may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

How to use the ink is not limited to the inkjet printing method. Specific examples of such methods other than the inkjet printing method include, but are not limited to, blade coating methods, gravure coating methods, bar coating methods, roll coating methods, knife coating methods, dip coating methods, die coating methods, and spray coating methods.

The applications of the ink of the present disclosure are not particularly limited. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc. The molded processed product is suitable for what is molded after surface-decorating. Examples thereof are gauges or operation panels of vehicles, office machines, electric and electronic machines, cameras, etc.

Moreover, image forming, recording, printing, etc. in the present disclosure represent the same meaning.

Furthermore, a print medium, a media, a printing target, etc. in the present disclosure represent the same meaning.

EXAMPLES

The present disclosure will be described below by way of Examples. The present disclosure should not be construed as being limited to these Examples. In Examples below, "part(s)" denotes "part(s) by mass." Moreover, preparations and evaluations were performed at a room temperature of 25° C., and relative humidity of 60%, unless otherwise stated.

Preparation Example 1 of Pigment Dispersion

<Preparation of Black Pigment Dispersion>
After pre-mixing the mixture of the following composition, the mixture was circulated and dispersed for 7 hours by means of a disk-type bead mill (obtained from SHINMARU ENTERPRISES CORPORATION, KDL-type, media: using zirconia beads each having a diameter of 0.3 mm), to thereby obtain a black pigment dispersion (pigment concentration: 15% by mass).
Carbon black pigment (product name: Monarch 800, obtained from Cabot Corporation): 15 parts
Anionic surfactant (product name: Pionin A-51-B, obtained from TAKEMOTO OIL & FAT Co., Ltd.): 2 parts
Ion-exchanged water: 83 parts
<Synthesis of Organo Polysiloxane Particle Dispersion Liquid>
(1) Organo Polysiloxane Particle Dispersion Liquid 1

A reaction vessel equipped with a stirrer, a thermometer, and a reflux cooling tube was charged with 630 parts of octamethyl cyclotetrasiloxane, 5 parts of hexamethyl disiloxane, and 0.5 parts of potassium hydroxide in a nitrogen atmosphere, and the resultant mixture was heated for 3 hours at 120° C. After neutralizing the resultant, the resultant was heated for 3 hours at 120° C. under reduced pressure, followed by performing filtration, to thereby obtain Organo Polysiloxane 1 in the form of oil.

The weight average molecular weight (Mw) of Organo Polysiloxane 1 as measured by GPC was 89,000.

Subsequently, a mixed fluid including 500 parts of Organo Polysiloxane 1, 25 parts of polyoxyethylene (4) lauryl ether, 25 parts of polyoxyethylene (20) cetyl ether, and 50 parts of ion-exchanged water was emulsified by means of a homomixer, followed by adding 650 parts of ion-exchanged water to the resultant emulsion, to thereby obtain Organo Polysiloxane Particle Dispersion Liquid 1.
(2) Organo Polysiloxane Particle Dispersion Liquid 2

A reaction vessel equipped with a stirrer, a thermometer, and a reflux cooling tube was charged with 630 parts of octamethyl cyclotetrasiloxane, 9 parts of hexamethyl disiloxane, and 0.5 parts of potassium hydroxide in a nitrogen atmosphere, and the resultant mixture was heated for 3 hours at 120° C. After neutralizing the resultant, the resultant was heated for 3 hours at 120° C. under reduced pressure, followed by performing filtration, to thereby obtain Organo Polysiloxane 2 in the form of oil.

The weight average molecular weight (Mw) of Organo Polysiloxane 2 as measured by GPC was 19,000.

Subsequently, a mixed fluid including 500 parts of Organo Polysiloxane 2, 25 parts of polyoxyethylene (4) lauryl ether, 25 parts of polyoxyethylene (20) cetyl ether, and 50 parts of ion-exchanged water was emulsified by means of a homomixer, followed by adding 650 parts of ion-exchanged water to the resultant emulsion, to thereby obtain Organo Polysiloxane Particle Dispersion Liquid 2.
(3) Organo Polysiloxane Particle Dispersion Liquid 3

A reaction vessel equipped with a stirrer, a thermometer, and a reflux cooling tube was charged with 630 parts of octamethyl cyclotetrasiloxane, 15 parts of hexamethyl disiloxane, and 0.5 parts of potassium hydroxide in a nitrogen atmosphere, and the resultant mixture was heated for 3 hours at 120° C. After neutralizing the resultant, the resultant was heated for 3 hours at 120° C. under reduced pressure, followed by performing filtration, to thereby obtain Organo Polysiloxane 3 in the form of oil.

The weight average molecular weight (Mw) of Organo Polysiloxane 3 as measured by GPC was 5,000.

Subsequently, a mixed fluid including 500 parts of Organo Polysiloxane 3, 25 parts of polyoxyethylene (4) lauryl ether, 25 parts of polyoxyethylene (20) cetyl ether, and 50 parts of ion-exchanged water was emulsified by means of a homo-mixer, followed by adding 650 parts of ion-exchanged water to the resultant emulsion, to thereby obtain Organo Polysiloxane Particle Dispersion Liquid 3.

(4) Organo Polysiloxane Particle Dispersion Liquid 4

A reaction vessel equipped with a stirrer, a thermometer, and a reflux cooling tube was charged with 630 parts of octamethyl cyclotetrasiloxane, 2.3 parts of hexamethyl disiloxane, and 0.5 parts of potassium hydroxide in a nitrogen atmosphere, and the resultant mixture was heated for 3 hours at 120° C. After neutralizing the resultant, the resultant was heated for 3 hours at 120° C. under reduced pressure, followed by performing filtration, to thereby obtain Organo Polysiloxane 4 in the form of oil.

The weight average molecular weight (Mw) of Organo Polysiloxane 4 as measured by GPC was 210,000.

Subsequently, a mixed fluid including 500 parts of Organo Polysiloxane 4, 25 parts of polyoxyethylene (4) lauryl ether, 25 parts of polyoxyethylene (20) cetyl ether, and 50 parts of ion-exchanged water was emulsified by means of a homo-mixer, followed by adding 650 parts of ion-exchanged water to the resultant emulsion, to thereby obtain Organo Polysiloxane Particle Dispersion Liquid 4.

(5) Organo Polysiloxane Particle Dispersion Liquid 5

A reaction vessel equipped with a stirrer, a thermometer, and a reflux cooling tube was charged with 630 parts of octamethyl cyclotetrasiloxane, 1.1 parts of hexamethyl disiloxane, and 0.5 parts of potassium hydroxide in a nitrogen atmosphere, and the resultant mixture was heated for 3 hours at 120° C. After neutralizing the resultant, the resultant was heated for 3 hours at 120° C. under reduced pressure, followed by performing filtration, to thereby obtain Organo Polysiloxane 5 in the form of oil.

The weight average molecular weight (Mw) of Organo Polysiloxane 5 as measured by GPC was 500.000.

Subsequently, a mixed fluid including 500 parts of Organo Polysiloxane 5, 25 parts of polyoxyethylene (4) lauryl ether, 25 parts of polyoxyethylene (20) cetyl ether, and 50 parts of ion-exchanged water was emulsified by means of a homo-mixer, followed by adding 650 parts of ion-exchanged water to the resultant emulsion, to thereby obtain Organo Polysiloxane Particle Dispersion Liquid 5.

(6) Organo Polysiloxane Particle Dispersion Liquid 6

A reaction vessel equipped with a stirrer, a thermometer, and a reflux cooling tube was charged with 630 parts of octamethyl cyclotetrasiloxane, 19 parts of hexamethyl disiloxane, and 0.5 parts of potassium hydroxide in a nitrogen atmosphere, and the resultant mixture was heated for 3 hours at 120° C. After neutralizing the resultant, the resultant was heated for 3 hours at 120° C. under reduced pressure, followed by performing filtration, to thereby obtain Organo Polysiloxane 6 in the form of oil.

The weight average molecular weight (Mw) of Organo Polysiloxane 6 as measured by GPC was 4,100.

Subsequently, a mixed fluid including 500 parts of Organo Polysiloxane 6, 25 parts of polyoxyethylene (4) lauryl ether, 25 parts of polyoxyethylene (20) cetyl ether, and 50 parts of ion-exchanged water was emulsified by means of a homo-mixer, followed by adding 650 parts of ion-exchanged water to the resultant emulsion, to thereby obtain Organo Polysiloxane Particle Dispersion Liquid 6.

(7) Organo Polysiloxane Particle Dispersion Liquid 7

A reaction vessel equipped with a stirrer, a thermometer, and a reflux cooling tube was charged with 630 parts of octamethyl cyclotetrasiloxane, 1 part of hexamethyl disiloxane, and 0.5 parts of potassium hydroxide in a nitrogen atmosphere, and the resultant mixture was heated for 3 hours at 120° C. After neutralizing the resultant, the resultant was heated for 3 hours at 120° C. under reduced pressure, followed by performing filtration, to thereby obtain Organo Polysiloxane 7 in the form of oil.

The weight average molecular weight (Mw) of Organo Polysiloxane 7 as measured by GPC was 540,000.

Subsequently, a mixed fluid including 500 parts of Organo Polysiloxane 7, 25 parts of polyoxyethylene (4) lauryl ether, 25 parts of polyoxyethylene (20) cetyl ether, and 50 parts of ion-exchanged water was emulsified by means of a homo-mixer, followed by adding 650 parts of ion-exchanged water to the resultant emulsion, to thereby obtain Organo Polysiloxane Particle Dispersion Liquid 7.

<Preparation of Pre-Processing Fluid>

Calcium nitrate tetrahydrate (10 parts), 18 parts of glycerin, 5 parts of propylene glycol, 2 parts of a silicone-based surfactant SAG-503A, and 65 parts of ion-exchanged water were mixed to obtain Pre-Processing Fluid 1.

The materials of the composition presented in Table 4 were mixed and stirred for 1 hour, followed by performing pressure filtration with a cellulose acetate membrane filter of 1.2 µm, to thereby obtain each pre-processing fluid. In Table 4, the part(s) represents part(s) by mass, and the total amount is determined as 100 parts by mass. Table 4 presents an amount of the metal ion in the pre-processing fluid and the weight average molecular weight (Mw) of the organo polysiloxane. The metal ion was measured by the above described ICP-AES. The weight average molecular weight (Mw) was measured as described above.

[Synthesis of First Resin]

A 1 L-four necked flask equipped with a nitrogen inlet tube, a dehydrating tube, a stirrer, and a thermocouple was charged with 1,4-butanediol as diol and sebacic acid as dicarboxylic acid at a ratio OH/COOH of 1.3, followed by adding 300 ppm of titanium tetraisopropoxide. The resultant mixture was allowed to react under nitrogen flow with discharging water, and the reaction was continued at 230° C. until an acid value of a resin reached 5 or less. Thereafter, the resultant was allowed to react under reduced pressure at a vacuum degree of 1 kPa with discharging 1,4-butanediol until a hydroxyl value reached 75, to thereby obtain First Resin 1.

A 1 L-four necked flask equipped with a nitrogen inlet tube, a dehydrating tube, a stirrer, and a thermocouple was charged with ethylene glycol as diol and sebacic acid as dicarboxylic acid at a ratio OH/COOH of 1.3, followed by adding 300 ppm of titanium tetraisopropoxide. The resultant mixture was allowed to react under nitrogen flow with discharging water, and the reaction was continued at 230° C. until an acid value of a resin reached 5 or less. Thereafter, the resultant was allowed to react under reduced pressure at a vacuum degree of 1 kPa with discharging ethylene glycol until a hydroxyl value reached 75, to thereby obtain First Resin 2.

A 1 L-four necked flask equipped with a nitrogen inlet tube, a dehydrating tube, a stirrer, and a thermocouple was charged with 1,6-hexanediol as diol and adipic acid as dicarboxylic acid at a ratio OH/COOH of 1.22, followed by adding 300 ppm of titanium tetraisopropoxide. The resultant mixture was allowed to react under nitrogen flow with discharging water, and the reaction was continued at 230° C. until an acid value of a resin reached 5 or less. Thereafter, the resultant was allowed to react at a vacuum degree of 0.6 kPa for 4 hours, to thereby obtain First Resin 3 (hydroxyl value: 75).

A 1 L-four necked flask equipped with a nitrogen inlet tube, a dehydrating tube, a stirrer, and a thermocouple was charged with 1,3-propanediol as diol and sebacic acid as dicarboxylic acid at a ratio OH/COOH of 1.3, followed by adding 300 ppm of titanium tetraisopropoxide. The resultant mixture was allowed to react under nitrogen flow with discharging water, and the reaction was continued at 230° C. until an acid value of a resin reached 5 or less. Thereafter, the resultant was allowed to react under reduced pressure at a vacuum degree of 1 kPa with discharging 1,3-propanediol until a hydroxyl value reached 75, to thereby obtain First Resin 4.

A 1 L-four necked flask equipped with a nitrogen inlet tube, a dehydrating tube, a stirrer, and a thermocouple was charged with 1,6-hexanediol as diol and fumaric acid as dicarboxylic acid at a ratio OH/COOH of 1.25, followed by adding 300 ppm of titanium tetraisopropoxide. The resultant mixture was allowed to react under nitrogen flow with discharging water, and the reaction was continued at 230° C. until an acid value of a resin reached 5 or less. Thereafter, the resultant was allowed to react at a vacuum degree of 0.6 kPa for 4 hours, to thereby obtain First Resin 5 (hydroxyl value: 75).

A 1 L-four necked flask equipped with a nitrogen inlet tube, a dehydrating tube, a stirrer, and a thermocouple was charged with ethylene glycol as diol and adipic acid as dicarboxylic acid at a ratio OH/COOH of 1.3, followed by adding 300 ppm of titanium tetraisopropoxide. The resultant mixture was allowed to react under nitrogen flow with discharging water, and the reaction was continued at 230° C. until an acid value of a resin reached 5 or less. Thereafter, the resultant was allowed to react under reduced pressure at a vacuum degree of 1 kPa with discharging ethylene glycol until a hydroxyl value reached 75, to thereby obtain First Resin 6.

A 1 L-four necked flask equipped with a nitrogen inlet tube, a dehydrating tube, a stirrer, and a thermocouple was charged with 3-methyl-1,5-pentanediol as diol and sebacic acid as dicarboxylic acid at a ratio OH/COOH of 1.22, followed by adding 300 ppm of titanium tetraisopropoxide. The resultant mixture was allowed to react under nitrogen flow with discharging water, and the reaction was continued at 230° C. until an acid value of a resin reached 5 or less. Thereafter, the resultant was allowed to react at a vacuum degree of 0.6 kPa for 4 hours, to thereby obtain First Resin 7 (hydroxyl value: 75).

A 1 L-four necked flask equipped with a nitrogen inlet tube, a dehydrating tube, a stirrer, and a thermocouple was charged with 1,6-hexanediol as diol and adipic acid as dicarboxylic acid at a ratio COOH/OH of 1.05, followed by adding 300 ppm of titanium tetraisopropoxide. The resultant mixture was allowed to react under nitrogen flow with discharging water, and the temperature was increased to 230° C., followed by continuing the reaction for 3 hours. Thereafter, the resultant was allowed to react at a vacuum degree of 0.6 kPa for 4 hours, to thereby obtain First Resin 8 (acid value: 15).

A 1 L-four necked flask equipped with a nitrogen inlet tube, a dehydrating tube, a stirrer, and a thermocouple was charged with propylene glycol as diol and isophthalic acid as dicarboxylic acid at a ratio COOH/OH of 1.2, followed by adding 300 ppm of titanium tetraisopropoxide. The resultant mixture was allowed to react under nitrogen flow with discharging methanol, and the temperature was increased to 230° C., followed by continuing the reaction for 3 hours. Thereafter, the resultant was allowed to react under reduced pressure at a vacuum degree of 0.6 kPa until an acid value reached 15, to thereby obtain First Resin 9.

A 1 L-four necked flask equipped with a nitrogen inlet tube, a dehydrating tube, a stirrer, and a thermocouple was charged with ethylene glycol as diol and sebacic acid as dicarboxylic acid at a ratio OH/COOH of 1.3, followed by adding 300 ppm of titanium tetraisopropoxide. The resultant mixture was allowed to react under nitrogen flow with discharging water, and the reaction was continued at 230° C. until an acid value of a resin reached 5 or less. Thereafter, the resultant was allowed to react under reduced pressure at a vacuum degree of 1 kPa with discharging ethylene glycol until a hydroxyl value reached 50, to thereby obtain First Resin 10.

A 1 L-four necked flask equipped with a nitrogen inlet tube, a dehydrating tube, a stirrer, and a thermocouple was charged with ethylene glycol as diol and sebacic acid as dicarboxylic acid at a ratio OH/COOH of 1.2, followed by adding 300 ppm of titanium tetraisopropoxide. The resultant mixture was allowed to react under nitrogen flow with discharging water, and the reaction was continued at 230° C. until an acid value of a resin reached 5 or less. Thereafter, the resultant was allowed to react under reduced pressure at a vacuum degree of 1 kPa with discharging ethylene glycol until a hydroxyl value reached 30, to thereby obtain First Resin 11.

A 1 L-four necked flask equipped with a nitrogen inlet tube, a dehydrating tube, a stirrer, and a thermocouple was charged with ethylene glycol as diol and sebacic acid as dicarboxylic acid at a ratio OH/COOH of 1.1, followed by adding 300 ppm of titanium tetraisopropoxide. The resultant mixture was allowed to react under nitrogen flow with discharging water, and the reaction was continued at 230° C. until an acid value of a resin reached 5 or less. Thereafter, the resultant was allowed to react under reduced pressure at a vacuum degree of 1 kPa with discharging ethylene glycol until a hydroxyl value reached 15, to thereby obtain First Resin 12.

A 1 L-four necked flask equipped with a nitrogen inlet tube, a dehydrating tube, a stirrer, and a thermocouple was charged with ethylene glycol as diol and sebacic acid as dicarboxylic acid at a ratio OH/COOH of 1.5, followed by adding 300 ppm of titanium tetraisopropoxide. The resultant mixture was allowed to react under nitrogen flow with discharging water, and the reaction was continued at 230° C. until an acid value of a resin reached 5 or less. Thereafter, the resultant was allowed to react under reduced pressure at a vacuum degree of 1 kPa with discharging ethylene glycol until a hydroxyl value reached 100, to thereby obtain First Resin 13.

A 1 L-four necked flask equipped with a nitrogen inlet tube, a dehydrating tube, a stirrer, and a thermocouple was charged with ethylene glycol as diol and sebacic acid as dicarboxylic acid at a ratio OH/COOH of 1.5, followed by adding 300 ppm of titanium tetraisopropoxide. The resultant mixture was allowed to react under nitrogen flow with discharging water, and the reaction was continued at 230° C. until an acid value of a resin reached 5 or less. Thereafter, the resultant was allowed to react under reduced pressure at a vacuum degree of 1 kPa with discharging ethylene glycol until a hydroxyl value reached 150, to thereby obtain First Resin 14.

[Production of Resin Particle Dispersion Liquid]

A resin particle dispersion liquid was synthesized in the following manner. First, a 300 mL-separable flask equipped with a stirrer, a thermometer, and a reflux tube was charged with polyol, isocyanate, and methyl ethyl ketone, which had been dehydrated by a molecular sieve, in the amounts (parts) presented in Table 1, and the resultant was heated to 70° C. under nitrogen flow, followed by adding 200 ppm of tin 2-ethylhexanate. Then, the resultant was allowed to react for 3 hours to 10 hours at 70° C. while measuring an isocyanate concentration of the system. Subsequently, the temperature of the system was lowered to 40° C., and trimethylamine was added. To the resultant, ion-exchanged water was added with stirring at 300 rpm, and the resultant was stirred for 1 hour. Thereafter, a chain extender was added, followed by stirring for 1 hour. Thereafter, the resultant was cooled to room temperature, and the solvent was removed by an evaporator to adjust a solid content to 30%, to thereby obtain a resin particle dispersion liquid.

All of the resin particle dispersion liquid included a polyurethane resin including a polyester segment except Resin Particle Dispersion Liquid 8 and Resin Particle Dispersion Liquid 9.

TABLE 1

| | Polyol 1 | | Polyol 2 | | Isocyanate | | MEK | Ion-exchanged water | Tri-ethyl amine | Di ethylene triamine |
|---|---|---|---|---|---|---|---|---|---|---|
| | type | parts | type | parts | type | parts | parts | parts | parts | parts |
| Resin particle dispersion liquid 1 | First Resin 1 | 50 | DMPA | 4.5 | IPDI | 22 | 50 | 150 | 5 | 2.2 |
| Resin particle dispersion liquid 2 | First Resin 2 | 50 | DMPA | 4 5 | IPDI | 22 | 50 | 150 | 5 | 2.2 |
| Resin particle dispersion liquid 3 | First Resin 3 | 50 | DMPA | 4.5 | IPDI | 22 | 50 | 150 | 5 | 2.2 |
| Resin particle dispersion liquid 4 | First Resin 4 | 50 | DMPA | 4.5 | IPDI | 22 | 50 | 150 | 5 | 2.2 |
| Resin particle dispersion liquid 5 | First Resin 5 | 50 | DMPA | 4.5 | IPDI | 22 | 50 | 150 | 5 | 2.2 |
| Resin particle dispersion liquid 6 | First, Resin 6 | 50 | DMPA | 4.5 | IPDI | 22 | 50 | 150 | 5 | 2.2 |
| Resin particle dispersion liquid 7 | First Resin 7 | 50 | DMPA | 4.5 | IPDI | 22 | 50 | 150 | 5 | 2.2 |
| Resin particle dispersion liquid 8 | First Resin 8 | 50 | DMPA | | IPDI | | 50 | 100 | | |
| Resin particle dispersion liquid 9 | First Resin 9 | 50 | DMPA | | IPDI | | 50 | 100 | | |
| Resin particle dispersion liquid 10 | First Resin 10 | 50 | DMPA | 4.5 | IPDI | 19 | 50 | 150 | 5 | 2.2 |
| Resin particle dispersion liquid 11 | First Resin 11 | 50 | DMPA | 4.5 | IPDI | 16 | 50 | 150 | 5 | 2.2 |
| Resin particle dispersion liquid 12 | First Resin 12 | 50 | DMPA | 4.5 | IPDI | 13 | 50 | 150 | 5 | 2.2 |
| Resin particle dispersion liquid 13 | First Resin 13 | 50 | DMPA | 4.5 | IPDI | 26 | 50 | 150 | 5 | 2.2 |
| Resin particle dispersion liquid 14 | First Resin 14 | 50 | DMPA | 4.5 | IPDI | 33 | 50 | 150 | 5 | 2.2 |

TABLE 1-continued

|  | Polyol 1 | | Polyol 2 | | Isocyanate | | MEK | Ion-exchanged water | Tri-ethyl amine | Di ethylene triamine |
| --- | --- | --- | --- | --- | --- | --- | --- | --- | --- | --- |
|  | type | parts | type | parts | type | parts | parts | parts | parts | parts |
| Resin particle dispersion liquid 15 | PTMG 1500 | 50 | DMPA | 4.5 | IPDI | 22 | 50 | 150 | 5 | 2.2 |

The details of the materials in Table 1 are as follows.
PTMG1500: polytetramethylene ether glycol (available from Mitsubishi Chemical Corporation)
DMPA: dimethylolpropionic acid
IPDI: isophorone diisocyanate

EXAMPLES

Preparation of Ink

The materials of the composition presented in Table 2 were mixed and stirred for 1 hour, followed by performing pressure filtration with a cellulose acetate membrane filter of 1.2 μm, to thereby obtain an ink. Ion-exchanged water was added to make a total of 100 parts.

TABLE 2

|  | Solvent 1 | | Solvent 2 | | Surfactant | | Pigment | |
| --- | --- | --- | --- | --- | --- | --- | --- | --- |
|  | type | parts | type | parts | type | parts | type | parts |
| Bk Ink 1 | glycerin | 25 | propylene glycol | 5 | SURFYNOL 465 | 0.2 | black pigment dispersion | 33 |
| Bk Ink 2 | glycerin | 25 | propylene glycol | 5 | SAG503A | 0.2 | black pigment dispersion | 33 |
| Bk Ink 3 | glycerin | 25 | propylene glycol | 5 | SAG503A | 0.2 | black pigment dispersion | 33 |
| Bk Ink 4 | glycerin | 25 | propylene glycol | 5 | SAG503A | 0.2 | black pigment dispersion | 33 |
| Bk Ink 5 | glycerin | 25 | propylene glycol | 5 | SAG503A | 0.2 | black pigment dispersion | 33 |
| Bk Ink 6 | glycerin | 25 | propylene glycol | 5 | SAG503A | 0.2 | black pigment dispersion | 33 |
| Bk Ink 7 | glycerin | 25 | propylene glycol | 5 | SAG503A | 0.2 | black pigment dispersion | 33 |
| Bk Ink 8 | glycerin | 25 | propylene glycol | 5 | SAG503A | 0.2 | black pigment dispersion | 33 |
| Bk Ink 9 | glycerin | 25 | propylene glycol | 5 | SAG503A | 0.2 | black pigment dispersion | 33 |
| Bk Ink 10 | glycerin | 25 | propylene glycol | 5 | SAG503A | 0.2 | black pigment dispersion | 33 |
| Bk Ink 11 | glycerin | 25 | propylene glycol | 5 | SAG503A | 0.2 | black pigment dispersion | 33 |
| Bk Ink 12 | glycerin | 25 | propylene glycol | 5 | SAG503A | 0.2 | black pigment dispersion | 33 |
| Bk Ink 13 | glycerin | 25 | propylene glycol | 5 | SAG503A | 0.2 | black pigment dispersion | 33 |
| Bk Ink 14 | glycerin | 25 | propylene glycol | 5 | SAG503A | 0.2 | black pigment dispersion | 33 |
| Bk Ink 15 | glycerin | 25 | propylene glycol | 5 | SAG503A | 0.2 | black pigment dispersion | 33 |
| Bk Ink 16 | glycerin | 25 | propylene glycol | 5 | SAG503A | 0.2 | black pigment dispersion | 33 |
| Bk Ink 17 | glycerin | 25 | propylene glycol | 5 | SAG503A | 0.2 | black pigment dispersion | 33 |
| Bk Ink 18 | glycerin | 25 | propylene glycol | 5 | SAG503A | 0.2 | black pigment dispersion | 33 |
| Bk Ink 19 | glycerin | 25 | propylene glycol | 5 | SAG503A | 0.2 | black pigment dispersion | 33 |
| Bk Ink 20 | glycerin | 25 | propylene glycol | 5 | SAG503A | 0.2 | black pigment dispersion | 33 |

TABLE 2-continued

| | | | | | | | | |
|---|---|---|---|---|---|---|---|---|
| Bk Ink 21 | glycerin | 25 | propylene glycol | 5 | SAG503A | 0.2 | black pigment dispersion | 33 |
| Bk Ink 22 | glycerin | 25 | propylene glycol | 5 | SAG503A | 0.2 | black. pigment dispersion | 33 |
| Bk Ink 23 | glycerin | 25 | propylene glycol | 5 | SAG503A | 0.2 | black pigment dispersion | 33 |
| Bk Ink 24 | glycerin | 25 | propylene glycol | 5 | SAG503A | 0.2 | black pigment dispersion | 33 |
| Bk Ink 25 | glycerin | 25 | propylene glycol | 5 | BYK348 | 0.2 | black pigment dispersion | 33 |
| Bk Ink 26 | ethylene glycol | 25 | DEGDEE | 5 | SAG503A | 0.2 | black pigment dispersion | 33 |

| | Resin 1 | | Resin 2 | | Ion-exchanged water | Surface tension with lifetime of 150 ms mN/m |
|---|---|---|---|---|---|---|
| | type | parts | type | parts | parts | |
| Bk Ink 1 | Resin Particle Dispersion Liquid 1 | 20 | | | balance | 54 |
| Bk Ink 2 | Resin Particle Dispersion Liquid 1 | 20 | | | balance | 48 |
| Bk Ink 3 | Resin Particle Dispersion Liquid 2 | 5 | | | balance | 50 |
| Bk Ink 4 | Resin Particle Dispersion Liquid 2 | 10 | | | balance | 49 |
| Bk Ink 5 | Resin Particle Dispersion Liquid 2 | 20 | | | balance | 47 |
| Bk Ink 6 | Resin Particle Dispersion Liquid 2 | 30 | | | balance | 45 |
| Bk Ink 7 | Resin Particle Dispersion Liquid 2 | 40 | | | balance | 44 |
| Bk Ink 8 | Resin Particle Dispersion Liquid 3 | 20 | | | balance | 47 |
| Bk Ink 9 | Resi Particle Dispersion Liquid 4 | 20 | | | balance | 48 |
| Bk Ink 10 | Resin Particle Dispersion Liquid 5 | 20 | | | balance | 46 |
| Bk Ink 11 | Resin Particle Dispersion Liquid 6 | 20 | | | balance | 48 |
| Bk Ink 12 | Resin Particle Dispersion Liquid 15 | 20 | | | balance | 47 |
| Bk Ink 13 | Resin Particle Dispersion Liquid 7 | 20 | | | balance | 48 |
| Bk Ink 14 | Resin Particle Dispersion Liquid 10 | 20 | | | balance | 49 |
| Bk Ink 15 | Resin Particle Dispersion Liquid 11 | 20 | | | balance | 48 |
| Bk Ink 16 | Resin Particle Dispersion Liquid 12 | 20 | | | balance | 46 |
| Bk Ink 17 | Resin Particle Dispersion Liquid 13 | 20 | | | balance | 47 |
| Bk Ink 18 | Resin Particle Dispersion Liquid 14 | 20 | | | balance | 48 |
| Bk Ink 19 | Resin Particle Dispersion Liquid 8 | 15 | Resin Particle Dispersion Liquid 9 | 5 | balance | 46 |
| Bk Ink 20 | Resin Particle Dispersion Liquid 8 | 10 | Resin Particle Dispersion Liquid 9 | 10 | balance | 47 |
| Bk Ink 21 | Resin Particle Dispersion Liquid 8 | 5 | Resin Particle Dispersion Liquid 9 | 15 | balance | 46 |
| Bk Ink 22 | Resi Particle Dispersion Liquid 8 | 15 | Resin Particle Dispersion Liquid 3 | 5 | balance | 47 |
| Bk Ink 23 | Resin Particle Dispersion Liquid 8 | 10 | Resin Particle Dispersion Liquid 3 | 10 | balance | 47 |
| Bk Ink 24 | Resin Particle Dispersion Liquid 8 | 5 | Resin Particle Dispersion Liquid 3 | 15 | balance | 48 |
| Bk Ink 25 | Resin Particle Dispersion Liquid 3 | 20 | | | balance | 49 |
| Bk Ink 26 | Resin Particle Dispersion Liquid 3 | 20 | | | balance | 40 |

The details of the materials in Table 2 are as follows.
SAG503A: silicone-based surfactant (obtained from Nissin Chemical Co., Ltd.)
BYK348: silicone-based surfactant (obtained from BYK)
DEGDEE: diethylene glycol diethyl ether <Printing Method>
Pre-processing was performed on Polyester Tropical (obtained from SHIKISENSHA CO., LTD.) cut into the A4 size by means of Inkjet Printer Ri100 (Ricoh Company Limited) charged with the pre-processing fluid at a deposition amount of 1.0 mg/cm². Subsequently, Polyester Tropical (obtained from SHIKISENSHA CO., LTD.), which had been pre-processed, was set in Inkjet Printer Ri6000 (obtained from Ricoh Company Limited) charged with the ink, and a solid image was formed thereon at 2.0 mg/cm². The resultant print was dried for 10 minutes in a hot air circulation thermostatic chamber set to 160° C., and friction fastness, texture, and coloring were evaluated.

<Friction Fastness>

Dry friction fastness was evaluated by means of JIS L0849 Type-II.

C or the better results are practically acceptable.

[Evaluation Criteria]
AA: Grade 5
A: Grade 4.5
B: Grade 4.0
C: Grade 3.5
D: Grade 3.0
E: Grade 2.5 or lower <Texture>

Texture (bending resistance) of the solid image cut out into a piece having a side of 9 cm was evaluated according to JIS L 1096 Method E.

C or the better results are practically acceptable.

[Evaluation Criteria]
AA: less than 25 g
A: 25 g or greater but less than 30 g
B: 30 g or greater but less than 35 g
C: 35 g or greater but less than 40 g
D: 40 g or greater but less than 45 g
E: 45 g or greater <Coloring>

The density of the solid image area of the sample was measured, and coloring was evaluated based on the following criteria. B or better results are acceptable.

[Evaluation Criteria]
A: The image density was 1.3 or greater.
B: The image density was 1.25 or greater but less than 1.3.
C: The image density was less than 1.25.

The results are presented in Table 3. The endothermic peak temperature Tm of the second heating, (Tm−Tc), and the quantity of heat absorbed Q1 at the endothermic peak were measured in the above-described manner. The results thereof are also presented in Table 3.

TABLE 3

| Ex./Comp. Ex. | Ink | Pre-processing fluid | Tm ° C. | Tm-Tc ° C. | Q1 J/g |
|---|---|---|---|---|---|
| Ex. 1 | Bk Ink 1 | Pre-Processing Fluid 1 | 44 | 36 | 10 |
| Ex. 2 | Bk Ink 2 | Pre-Processing Fluid 1 | 43 | 34 | 11 |
| Ex. 3 | Bk Ink 3 | Pre-Processing Fluid 1 | 50 | 41 | 2 |
| Ex. 4 | Bk Ink 4 | Pre-Processing Fluid 1 | 49 | 37 | 5 |
| Ex. 5 | Bk Ink 5 | Pre-Processing Fluid 1 | 51 | 35 | 11 |
| Ex. 6 | Bk Ink 6 | Pre-Processing Fluid 1 | 54 | 33 | 15 |
| Ex. 7 | Bk Ink 7 | Pre-Processing Fluid 1 | 52 | 31 | 19 |
| Ex. 8 | Bk Ink 8 | Pre-Processing Fluid 1 | 37 | 38 | 10 |
| Ex. 9 | Bk Ink 9 | Pre-Processing Fluid 1 | 28 | 44 | 11 |
| Ex. 10 | Bk Ink 11 | Pre-Processing Fluid 1 | 2 | 46 | 8 |
| Ex. 11 | Bk Ink 14 | Pre-Processing Fluid 1 | 59 | 29 | 7 |
| Ex. 12 | Bk Ink 15 | Pre-Processing Fluid 1 | 46 | 47 | 4 |
| Ex. 13 | Bk Ink 16 | Pre-Processing Fluid 1 | 42 | 56 | 3 |
| Ex. 14 | Bk Ink 17 | Pre-Processing Fluid 1 | 65 | 23 | 16 |
| Ex. 15 | Bk Ink 18 | Pre-Processing Fluid 1 | 74 | 17 | 26 |
| Ex. 16 | Bk Ink 19 | Pre-Processing Fluid 1 | 46 | 53 | 33 |
| Ex. 17 | Bk Ink 20 | Pre-Processing Fluid 1 | 41 | 74 | 21 |
| Ex. 18 | Bk Ink 22 | Pre-Processing Fluid 1 | 47 | 16 | 35 |
| Ex. 19 | Bk Ink 23 | Pre-Processing Fluid 1 | 45 | 22 | 24 |
| Ex. 20 | Bk Ink 24 | Pre-Processing Fluid 1 | 42 | 31 | 15 |
| Ex. 21 | Bk Ink 25 | Pre-Processing Fluid 1 | 38 | 37 | 11 |
| Ex. 22 | Bk Ink 26 | Pre-Processing Fluid 1 | 39 | 38 | 10 |
| Ex. 23 | Bk Ink 16 | Pre-Processing Fluid 2 | 42 | 56 | 3 |
| Ex. 24 | Bk Ink 16 | Pre-Processing Fluid 3 | 42 | 56 | 3 |
| Ex. 25 | Bk Ink 16 | Pre-Processing Fluid 4 | 42 | 56 | 3 |
| Ex. 26 | Bk Ink 16 | Pre-Processing Fluid 5 | 42 | 56 | 3 |
| Ex. 27 | Bk Ink 16 | Pre-Processing Fluid 6 | 42 | 56 | 3 |
| Ex. 28 | Bk Ink 16 | Pre-Processing Fluid 7 | 42 | 56 | 3 |
| Ex. 29 | Bk Ink 16 | Pre-Processing Fluid 8 | 42 | 56 | 3 |
| Ex. 30 | Bk Ink 5 | Pre-Processing Fluid 9 | 51 | 35 | 11 |
| Ex. 31 | Bk Ink 5 | Pre-Processing Fluid 10 | 51 | 35 | 11 |
| Ex. 32 | Bk Ink 5 | Pre-Processing Fluid 11 | 51 | 35 | 11 |
| Ex. 33 | Bk Ink 5 | Pre-Processing Fluid 12 | 51 | 35 | 11 |
| Ex. 34 | Bk Ink 5 | Pre-Processing Fluid 13 | 51 | 35 | 11 |
| Ex. 35 | Bk Ink 5 | Pre-Processing Fluid 14 | 51 | 35 | 11 |
| Ex. 30 | Bk Ink 5 | Pre-Processing Fluid 15 | 51 | 35 | 11 |
| Ex. 34 | Bk Ink 5 | Pre-Processing Fluid 16 | 51 | 35 | 11 |
| Comp. Ex. 1 | Bk Ink 10 | Pre-Processing Fluid 1 | 83 | 28 | 9 |
| Comp. Ex. 2 | Bk Ink 12 | Pre-Processing Fluid 1 | 16 | 47 | 6 |
| Comp. Ex. 3 | Bk Ink 13 | Pre-Processing Fluid 1 | — | — | — |
| Comp. Ex. 4 | Bk Ink 21 | Pre-Processing Fluid 1 | — | — | — |

| Ex./Comp. Ex. | ink surface tension mN/m | Friction fastness | Bending resistance | Coloring |
|---|---|---|---|---|
| Ex. 1 | 54 | B | A | B |
| Ex. 2 | 48 | B | A | A |
| Ex. 3 | 50 | C | A | A |
| Ex. 4 | 49 | B | A | A |
| Ex. 5 | 47 | A | A | A |
| Ex. 6 | 45 | A | B | A |
| Ex. 7 | 44 | A | C | A |
| Ex. 8 | 47 | B | A | A |
| Ex. 9 | 48 | C | A | A |
| Ex. 10 | 48 | U | A | A |
| Ex. 11 | 49 | B | B | A |
| Ex. 12 | 48 | B | B | A |
| Ex. 13 | 46 | C | C | A |
| Ex. 14 | 47 | A | B | A |
| Ex. 15 | 48 | A | C | A |
| Ex. 16 | 46 | B | B | A |
| Ex. 17 | 47 | C | C | A |
| Ex. 18 | 47 | C | B | A |
| Ex. 19 | 47 | B | B | A |
| Ex. 20 | 48 | B | A | A |
| Ex. 21 | 49 | B | A | A |
| Ex. 22 | 40 | B | A | A |
| Ex. 23 | 46 | AA | AA | A |
| Ex. 24 | 46 | AA | AA | A |
| Ex. 25 | 46 | A | A | A |
| Ex. 26 | 46 | AA | AA | A |
| Ex. 27 | 46 | A | A | A |
| Ex. 28 | 46 | B | B | A |
| Ex. 29 | 46 | B | B | A |
| Ex. 30 | 47 | A | A | B |
| Ex. 31 | 47 | A | A | B |
| Ex. 32 | 47 | A | A | B |
| Ex. 33 | 47 | A | A | A |
| Ex. 34 | 47 | A | A | A |
| Ex. 35 | 47 | A | A | A |
| Ex. 33 | 47 | B | A | A |
| Ex. 34 | 47 | C | B | A |
| Comp. Ex. 1 | 46 | B | E | A |
| Comp. Ex. 2 | 47 | D | A | A |
| Comp. Ex. 3 | 48 | E | A | A |
| Comp. Ex. 4 | 46 | B | D | A |

It was found from the results presented in Table 3 that Examples had the practically acceptable or higher level of the fastness and texture, but Comparative Examples could not achieve the satisfactory fastness and satisfactory texture at the same time. In Table 3, an endothermic peak of the second heating could not be observed with the dried products of the inks of Comparative Examples 3 and 4.

TABLE 4

| Processing fluid | Solvent 1 type | Parts | Solvent 2 type | parts | Surfactant type | parts |
|---|---|---|---|---|---|---|
| Pre-Processing Fluid 1 | glycerin | 18 | propylene glycol | 5 | SAG-503A | 2 |
| Pre-Processing Fluid 2 | glycerin | 18 | propylene glycol | 5 | SAG-503A | 2 |
| Pre-Processing Fluid 3 | glycerin | 18 | propylene glycol | 5 | SAG-503A | 2 |
| Pre-Processing Fluid 4 | glycerin | 18 | propylene glycol | 5 | SAG-503A | 2 |
| Pre-Processing Fluid 5 | glycerin | 18 | propylene glycol | 5 | SAG-503A | 2 |
| Pre-Processing Fluid 6 | glycerin | 18 | propylene glycol | 5 | SAG-503A | 9 |
| Pre-Precessing Fluid 7 | glycerin | 18 | propylene glycol | 5 | SAG-503A | 2 |
| Pre-Processing Fluid8 | glycerin | 18 | propylene glycol | 5 | SAG-503A | 2 |
| Pre-Processing Fluids | glycerin | 18 | propylene glycol | 5 | SAG-503A | 2 |
| Pre-Processing Fluid 10 | glycerin | 18 | propylene glycol | 5 | SAG-503A | 2 |
| Pre-Processing Fluid 11 | glycerin | 18 | propylene glycol | 5 | SAG-503A | 2 |
| Pre-Processing Fluid 12 | glycerin | 18 | propylene glycol | 5 | SAG-503A | 9 |
| Pre-Processing Fluid 13 | glycerin | 18 | propylene glycol | 5 | SAG-503A | 9 |
| Pre-Processing Fluid 14 | glycerin | 18 | propylene glycol | 5 | SAG-503A | 2 |
| Pre-Processing Fluid 15 | glycerin | 18 | propylene glycol | 5 | SAG-503A | 2 |
| Pre-Processing Fluid 16 | glycerin | 18 | propylene glycol | 5 | SAG-503A | 2 |

| Processing fluid | Metal salt type | parts | Metal ion concentration [g/L] | Organo polysiloxane particle dispersion Liquid type | Mw | parts | Ion-exchanged water parts |
|---|---|---|---|---|---|---|---|
| Pre-Processing Fluid 1 | calcium nitrate tetrahydrate | 10 | 17.0 | — | — | — | balance |
| Pre-Processing Fluid 2 | calcium nitrate tetrahydrate | 10 | 17.0 | Dispersion Liquid 1 | 89,000 | 10 | balance |
| Pre-Processing Fluid 3 | calcium nitrate tetrahydrate | 10 | 17.0 | Dispersion Liquid 2 | 19,000 | 10 | balance |
| Pre-Processing Flaid 4 | calcium nitrate tetrahydrate | 10 | 17.0 | Dispersion Liquid 3 | 5,000 | 10 | balance |
| Pre-Processing Fluid 5 | calcium nitrate tetrahydrate | 10 | 17.0 | Dispersion Liquid 4 | 210,000 | 10 | balance |
| Pre-Processing Fluid 6 | calcium nitrate tetrahydrate | 10 | 17.0 | Dispersion Liquid 5 | 500,000 | 10 | balance |
| Pre-Processing Fluid 7 | calcium nitrate tetrahydrate | 10 | 17.0 | Dispersion Liquid 6 | 4,100 | 10 | balance |
| Pre-Processing Fluid 8 | calcium nitrate tetrahydrate | 10 | 17.0 | Dispersion Liquid 7 | 540,000 | 10 | balance |
| Pre-Processing Fluid 9 | calcium nitrate tetrahydrate | 0.3 | 0.5 | — | — | — | balance |
| PreProcessing Fluid 10 | calcium nitrate tetrahydrate | 0.5 | 0.8 | — | — | — | balance |
| Pre-Processing Fluid 11 | calcium nitrate tetrahydrate | 1.0 | 1.7 | — | — | — | balance |
| Pre-Processing Fluid 12 | calcium nitrate tetrahydrate | 2.4 | 40 | — | — | — | balance |
| Pre-Processing Fluid 13 | calcium nitrate tetrahydrate | 5.3 | 9.0 | — | — | — | balance |
| Pre-Processing Fluid 14 | calcium nitrate tetrahydrate | 10.6 | 18.0 | — | — | — | balance |
| Pre-Processing Fluid 15 | calcium nitrate tetrahydrate | 11.8 | 20.0 | — | — | — | balance |
| Pre-Processing Fluid 16 | calcium nitrate tetrahydrate | 13 | 22.1 | — | — | — | balance |

What is claimed is:

1. An ink comprising:
water; and
an organic solvent,
wherein a dried product of the ink has an endothermic peak temperature Tm of 22° C. or higher but 74° C. or lower as measured by differential scanning calorimetry,
the differential scanning calorimetry comprises first heating, cooling, and second heating, where the first heating is heating the dried product of the ink from −60° C. to 140° C. at a heating rate of 10° C./min, the cooling, which is performed after the first heating, is cooling a heated product obtained in the first heating from 140° C. to −60° C. at a cooling rate of −10° C./min, and the second heating, which is performed after the cooling, is heating a cooled product obtained in the cooling from −60° C. to 140° C. at a heating rate of 10° C./min, and
the endothermic peak temperature Tm is an endothermic peak temperature in the second heating.

2. The ink according to claim 1,
wherein an exothermic peak temperature Tc in the cooling and the endothermic peak temperature Tm in the second heating satisfy a relationship represented by:

$$20 \leq (Tm-Tc) \leq 70.$$

3. The ink according to claim 2,
wherein a quantity of heat absorbed Q1 at an endothermic peak in the second heating is from 2 J/g through 30 J/g.

4. The ink according to claim 1, further comprising a polyurethane resin comprising a polyester segment.

5. The ink according to claim 1, further comprising a silicone-based surfactant.

6. The ink according to claim 1,
wherein the ink has a dynamic surface tension of 40 mN/m or greater but 50 mN/m or less at 25° C. with lifetime of 150 ms.

7. A pre-processing fluid-ink set comprising:
a pre-processing fluid; and
the ink according to claim 1.

8. The pre-processing fluid-ink set according to claim 7, wherein the pre-processing fluid comprises organo polysiloxane having a weight average molecular weight of 5,000 or greater but 500,000 or less.

9. The pre-processing fluid-ink set according to claim 7, wherein the pre-processing fluid comprises a metal ion, and an amount of the metal ion is 0.8 g/L or greater but 20 g/L or less.

10. An inkjet printing device comprising:
a discharging unit configured to discharge an ink,
wherein the ink comprises:
water; and
an organic solvent,
wherein a dried product of the ink has an endothermic peak temperature Tm of 22° C. or higher but 74° C. or lower as measured by differential scanning calorimetry,
the differential scanning calorimetry comprises first heating, cooling, and second heating, where the first heating is heating the dried product of the ink from −60° C. to 140° C. at a heating rate of 10° C./min, the cooling, which is performed after the first heating, is cooling a heated product obtained in the first heating from 140° C. to −60° C. at a cooling rate of −10° C./min, and the second heating, which is performed after the cooling, is heating a cooled product obtained in the cooling from −60° C. to 140° C. at a heating rate of 10° C./min, and
the endothermic peak temperature Tm is an endothermic peak temperature in the second heating.

11. The inkjet printing device according to claim 10, further comprising a unit configured to apply a pre-processing fluid.

12. An inkjet printing method comprising
discharging an ink,
wherein the ink comprises:
water; and
an organic solvent,
wherein a dried product of the ink has an endothermic peak temperature Tm of 22° C. or higher but 74° C. or lower as measured by differential scanning calorimetry,
the differential scanning calorimetry comprises first heating, cooling, and second heating, where the first heating is heating the dried product of the ink from −60° C. to 140° C. at a heating rate of 10° C./min, the cooling, which is performed after the first heating, is cooling a heated product obtained in the first heating from 140° C. to −60° C. at a cooling rate of −10° C./min, and the second heating, which is performed after the cooling, is heating a cooled product obtained in the cooling from −60° C. to 140° C. at a heating rate of 10° C./min, and
the endothermic peak temperature Tm is an endothermic peak temperature in the second heating.

13. The inkjet printing method according to claim 12, further comprising applying a pre-processing fluid.

* * * * *